Patented July 6, 1943

2,323,874

UNITED STATES PATENT OFFICE 2,323,874

COMPOSITION OF MATTER

Earle W. McMullen, Joplin, Mo., and Donald J. Doan, Cincinnati, Ohio, assignors to The Eagle-Picher Lead Company, Cincinnati, Ohio, a corporation of Ohio No Drawing. Application May 23, 1940, Serial No. 336,892

2 Claims. (Cl. 252—270)

Our invention relates to a new article of manufacture and more specifically to a composition of matter comprising a porous insoluble structure containing a compound of high specific gravity which normally occupies a small volume for a given weight such as a compound of an amphoteric metal, combined with a compound of low specific gravity comprising a binding material which at the temperature of calcination does not react with the compound, a porosity agent and an integrating material designed to prevent separation of the coalesced active material and binder from the porosity agent.

Many methods are in use today for the elimination of undesirable compounds from gasoline. In one of these, known as the vapor phase process, the active agents are chlorine, and zinc oxide in intimate association with the gases in such a state as to offer a minimum of physical interference with the rate of movement, not subject to dispersion or separation by the force of the flow, or disintegration due to destructive strains. Many attempts to bring the active agents into intimate contact with the flow of the gases have been made and it has been proposed to incorporate them as part of an integrated mass comprising a self-supported structure capable of withstanding the destructive strains to which it is subjected, such as the temperature and pressure of the matter within the tower, treatment of the particles upon removal from contact with the gases and reconditioning for subsequent use. One such form of structure has consisted of zinc oxide and plaster of Paris formed into a pellet in admixture with water and allowed to set. The physical strength of such a structure was inadequate and the pellets were of low porosity, which prevented the gases penetrating to the active material embedded in the pellet so that only the zinc oxide near the surface was effective in the treating process. Furthermore at the temperatures of use and reconditioning the gypsum of the pellet was again dehydrated and disintegrated rapidly.

In carrying out experiments to find an adaptable form of structure which is adequate to our purposes, we have determined that a pellet in order to withstand the destructive force to which it is subjected in normal use such as stress and strain and having the required degree of rigidity, porosity and stability may be prepared by admixing zinc oxide, bentonite, tripoli and asbestos in such proportions as to maintain the active agent in an unimpaired condition through the life of the pellet structure, while permitting access of the gases to all parts of the pellet.

In practice we prefer to select a zinc oxide adaptable for use in the paint, ceramic or rubber industry and varying from 0.2 to 1.0 microns in diameter. Other types and kinds of zinc oxide may serve our purpose equally well and have been used with satisfactory results, the above illustration being given by way of example only. To this we add bentonite to serve as the bonding agent, tripoli to provide porosity and asbestos fibers which serve to reinforce the mass. The dry ingredients are blended together, made into a paste with water formed into pellets and dried. It is then subjected to heat at a temperature of approximately 1000° F. to break down the gel structure and transform the clay so that it no longer reacts with water in which condition its structure is not broken down by strain or heat and its tenacity remains unimpaired on reconditioning.

As an example of the composition readily adaptable for our purpose we may combine the following critical parts by weight:

| | |
|---|---|
| Zinc oxide | 40 |
| Bentonite clay | 20 |
| Tripoli | 25 |
| Asbestos fiber | 15 |

In order to increase the reactivity we may raise the zinc oxide content to 50 or even 60 parts by weight, but at the expense of strength and rigidity of the structure. Again in very large towers where the weight of the mass is many tons we may prefer to increase the percentage of bentonite, or bentonite and asbestos, thereby increasing the physical strength but reducing the degree of porosity and reactivity.

To more firmly bond the zinc oxide to the pellet after firing we may bring the pellet into contact with a mineral acid such as dilute hydrochloric or commercial muriatic acid. This combines with the zinc oxide to form zinc oxy-chloride which provides an excellent cementitious material. In addition the zinc oxy-chloride formed is essential to the quick initiation of the reaction with the undesirable compounds in the gaseous vapors.

The surface of the pellets are smooth to the touch, non-dusty and can be readily packed in bags or cartons for handling on shipping.

By our invention we are enabled to expose the maximum surface of the reactive agent to the action of the hydrocarbon gases whereby we are enabled to increase the activity of the zinc oxide in a manner hitherto unknown.

Having thus disclosed our invention, what we claim as new and desire to secure by Letters Patent is:

1. A new composition of matter consisting of a porous insoluble structure calcined at a temperature of approximately 1000° F. and consisting of zinc oxide 40 parts by weight, a porosity agent consisting of tripoli 25 parts by weight, bentonite 20 parts by weight in association with an inert material consisting of asbestos 15 parts by weight, and being adapted to permit hydrocarbon vapors to enter said structure and contact the zinc oxide associated therewith.

2. A new composition of matter consisting of a calcined porous insoluble structure calcined at a temperature of approximately 1000° F. consisting of zinc oxychloride 40 parts by weight, a porosity agent consisting of tripoli 25 parts by weight, bentonite 20 parts by weight in association with an inert material consisting of asbestos 15 parts by weight, and being adapted to permit hydrocarbon vapors to enter said structure and contact the zinc oxychloride associated therewith.

EARLE W. McMULLEN.
DONALD J. DOAN.